(12) United States Patent
Lee et al.

(10) Patent No.: US 9,690,006 B2
(45) Date of Patent: Jun. 27, 2017

(54) DOWNHOLE LOGGING SYSTEM WITH AZIMUTHAL AND RADIAL SENSITIVITY

(71) Applicant: HALLIBURTON ENERGY SERVICES, INC., Houston, TX (US)

(72) Inventors: Dongwon Lee, Kingwood, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/758,700

(22) PCT Filed: Jan. 21, 2014

(86) PCT No.: PCT/US2014/012310
§ 371 (c)(1),
(2) Date: Jun. 30, 2015

(87) PCT Pub. No.: WO2015/112118
PCT Pub. Date: Jul. 30, 2015

(65) Prior Publication Data
US 2016/0282505 A1    Sep. 29, 2016

(51) Int. Cl.
*G01V 5/08* (2006.01)
*G01V 5/12* (2006.01)
*G21K 1/02* (2006.01)

(52) U.S. Cl.
CPC .............. *G01V 5/08* (2013.01); *G01V 5/125* (2013.01); *G21K 1/025* (2013.01)

(58) Field of Classification Search
CPC ........... G01V 5/08; G01V 5/125; G21K 1/025
See application file for complete search history.

(56) References Cited

U.S. PATENT DOCUMENTS

| | | | |
|---|---|---|---|
| 3,562,528 A | 2/1971 | Joyce | |
| 4,618,765 A | 10/1986 | Sonne | |
| 4,825,454 A | 4/1989 | Annis et al. | |
| 5,448,073 A * | 9/1995 | Jeanguillaume | G01T 1/1642 250/363.02 |
| 2003/0042426 A1 | 3/2003 | McGregor et al. | |

(Continued)

FOREIGN PATENT DOCUMENTS

WO    9733141    9/1997
WO    2013101981    7/2013

OTHER PUBLICATIONS

Copenheaver, PCT Written Opinion for PCT Application No. PCT/US2014/012310 dated May 7, 2014.

(Continued)

*Primary Examiner* — David Porta
*Assistant Examiner* — Mindy Vu
(74) *Attorney, Agent, or Firm* — Locke Lord LLP

(57) ABSTRACT

Embodiments of the invention provide a downhole tool that includes a photon source, a photon detector having a plurality of detector pixels in a cylindrical row and column arrangement, and a radial collimator having at least two concentric frustoconical collimators circumferentially arranged about the photon detector and at least two azimuthal collimating members radially arranged with respect to the photon detector, wherein one of the azimuthal collimating members is on a first side of a detector pixel and a second azimuthal collimator is on a second side of a detector pixel opposite the first side.

17 Claims, 5 Drawing Sheets

(56) References Cited

U.S. PATENT DOCUMENTS

2010/0027755 A1* 2/2010 Teodorescu .............. G21K 1/02
378/147
2011/0284732 A1 11/2011 Korkin et al.
2013/0058462 A1* 3/2013 Jenkins ................... G21K 1/04
378/147

OTHER PUBLICATIONS

Copenheaver, PCT Search Report for PCT Application No. PCT/US2014/012310 dated May 7, 2014.
Teague, Philip Neil. "Imaging of Backscattered Ionizing Radiation-A Key Enabler for through Mud Borehole Imaging." Offshore Technology Conference. Offshore Technology Conference, 2011.

* cited by examiner

DOWNHOLE LOGGING SYSTEM WITH AZIMUTHAL AND RADIAL SENSITIVITY

CROSS-REFERENCE TO RELATED APPLICATIONS

The application is related to U.S. patent application Ser. No. 14/758,695 filed on Jun 30, 2015, entitled "Method and apparatus for downhole photon imaging," by Dongwon Lee and Weijun Guo.

TECHNICAL FIELD OF THE INVENTION

The embodiments disclosed herein relate to downhole logging systems, and more particularly, to a downhole logging system with azimuthal and radial sensitivity.

BACKGROUND OF THE INVENTION

Downhole logging systems are used to measure the physical, chemical, and structural properties of subterranean geological formations. The downhole logging systems generally include a downhole tool that is either lowered into a borehole on a wireline cable (referred to as "wireline logging") or placed just behind a drill bit as part of the drill pipe itself (referred to as "logging-while-drilling"). The logging systems may employ various acoustic, nuclear, and electrical measurement techniques to acquire downhole logs of the properties of a downhole formation.

One type of downhole logging system makes use of a physical phenomenon known as Compton scattering. Generally, in Compton scattering, the number of backscattered photons from an object in front of a photon source is a function of photon energy and backscattering angle. The material properties, such as the attenuation coefficient, thickness and density of the object may also affect the number of backscattered photons. Downhole tools may be designed to emit photons with a photon energy in a region where Compton scattering is dominant. These photons are then backscattered by materials in the borehole and subsequently detected by equipment on the tool. The backscattering angle of the photons that the tool is sensitive to may be determined by the design of the detector collimator geometry. The number of backscattered and detected photons may be proportional to the density of the object, assuming single Compton scattering occurs. Thus, the tool can be used to determine the material density of an object in proximity to the logging system by counting the number of photons backscattered from the object. However, due to multiple scattering of photons and other shortcomings in conventional downhole tools, a need exists in the art for downhole tools with a high azimuthal and radial sensitivity to backscattered photons.

BRIEF DESCRIPTION OF THE SEVERAL VIEWS OF THE DRAWINGS

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

Figure 1:
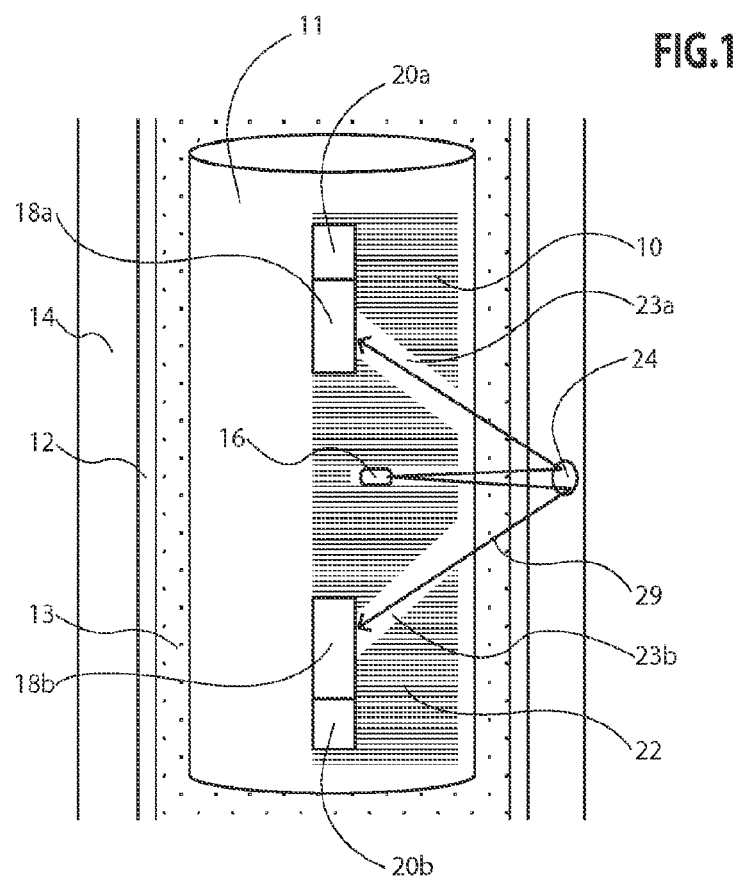
FIG. 1 is a schematic diagram of a downhole logging system for downhole photon imaging according to a disclosed embodiment.

Referring to FIG. 1, an apparatus 10 for downhole photon imaging of a wellbore casing is illustrated according to one embodiment of the invention. The apparatus 10 is assembled into a downhole tool 11 that can be lowered into a wellbore casing 12, which may be filled with drilling fluid or mud 13. Cement 14 is poured around the casing 12 to provide zonal isolation. Apparatus 10 includes a photon source 16 which emits photons at one or more energy levels or over a broad range of energy levels. Examples of the photon source 16 include chemical sources, such as Cesium-137 and electronic sources, such as x-ray tubes. In other embodiments, induced gamma rays from a neutron activation source, made radioactive by neutron bombardment may also provide a source of photons. The photon flux generated by photon source 16 may be collimated or focused to define the volume of the material selected for imaging.

Apparatus 10 further includes two photon detectors 18a and 18b, which act as scintillating devices to produce a light signal in response to received photons. An example of a photon detector 18 suitable for use in embodiments of the invention may be a gamma-ray scintillator or a solid state detector, such as those using thallium doped sodium iodide (NaI(Tl)), semi-conductors. However, other scintillating devices that can generate light signals responsive to collected photons may be employed in the apparatus 10. The photon detectors 18a and 18b in this embodiment are in a cylindrical shape, but other shapes may also be applicable.

The photon detectors in the embodiment shown in FIG. 1 are coupled to a pair of photosensors. In this embodiment, photon detector 18a is coupled with the photosensor 20a and photon detector 18b is coupled with the photosensor 20b. The photon detectors and photosensors may be closely coupled together to prevent signal losses. Examples of photosensors suitable in embodiments of the invention include photomultiplier tubes (PMT) or photodiodes. In another embodiment, stacking of multiple pixelated PMTs, or multi-anode PMTs may also be used. In still a further embodiment, light-guides or optical fibers may be used, allowing the photosensors to be positioned in the tool, but not necessarily limited to being located directly behind detectors. According to another embodiment, a silicon photomultiplier (SiPM) may be used to build a suitable cylindrical and highly pixelated photosensor unit. SiPM also is a silicon-based diode (size of a few mm square) but its signal amplification may be comparable to a traditional PMT.

Other light sensing devices that can generate electrical signals in response to incident light received from the photon detectors 18a and 18b may also be used in alternative embodiments of the apparatus 10 depicted in FIG. 1.

Coupling the photon detectors 18a, 18b to the photosensors 20a, 20b may be done in various ways known to those of skill in the art. For example, the photon detectors and photosensors may be coupled using an optical gel or an optical pad. In other embodiments, fiber optic cables may be used to transmit light generated by the photon detectors to the photosensors.

In other embodiments, the light transmission between the photon detectors 18a, 18b and the photosensors 20a and 20b, may be enhanced or amplified to increase the sensitivity of the apparatus 10. This may be done by, for example, matching the wave length of the scintillation light to a region where the photosensor's peak sensitivity lies. In another implementation, a high efficiency reflector material may be placed around the scintillator to collect more light from the scintillator and pass it to the photosensor. Further, these techniques could be combined to optimize the amount of light received at the photosensor.

Although the apparatus shown in FIG. 1 is depicted with a pair of coupled photon detectors and sensors, this is not intended as a limitation, and other embodiments of the invention may be implemented with any number of photon detectors and photo sensors as a matter of design choice.

The apparatus 10 is provided with a housing 22 accommodating the photon source 16, photon detectors 18a, 18b, and photosensors 20a, 20b. In one embodiment, the housing 22 is made of shielding material to prevent photons from hitting the detectors 18a, 18b directly. This prevents detection of photons that were not backscattered by the area of interest in the cement being analyzed from generating unwanted noise in the photosensors 20a, 20b.

The shielding material is provided with openings or channels 23a and 23b which provide a pathway for photons backscattered from any defect 24 in the area of interest in the cement 14 to reach the photo-detectors 18a and 18b. Thus, the housing 22 is designed to restrict the photons detected by the detectors to the photons that indicate a defect of some sort in the cement and eliminate unwanted photons that would be a source of noise.

The photon source 16 may be placed in the middle of the housing 22, and the two photon detectors 18a and 18b may be disposed symmetrically with respect to the back side of the photon source 16 so that they only receive backscattered photons emitted by the photon source 16. To receive sufficient counts of backscattered photons for assessing the quality of a target object, the photon detectors are preferably not placed, for example, more than twelve inches away from the photon source 16. Otherwise, the detected number of backscattered photons might be too low to be of practical use. In one embodiment, the detectors are arranged no more than four to six inches from the source 16. In a further embodiment, the photon count may be considered sufficient when its statistical uncertainty, measured, for example, according to the square root of the count, drops below a certain threshold level, for example, 1% of the count. Measurement time may be varied to achieve this threshold level. A plurality of ring-shaped photon detector rows, concentrically arranged to form a cylinder may be coupled to a concentric photosensor placed inside the cylinder of photon detector rows.

In another embodiment, the apparatus 10 may be provided with a collimator to assist in the detection of backscattered photons from a target area in the cement surrounding the casing 12. For example, two collimators, each with a cylindrical shape, may be arranged around the two photon detectors 18a and 18b, respectively, which has a number of slots on each collimator to allow backscattered photons to reach the photon detectors. The collimator may further limit the backscatter angle of the photons that the photon detectors can receive. This allows the apparatus 10 to determine the minimum size of the structural anomaly that it may identify. In one embodiment, the collimator may be designed with a geometry that restricts the detection parameters to photons generated by a single Compton backscattering and from a preselected backscatter angle, while rejecting photons that go through multiple Compton scatterings or, at least, greatly reducing them.

As described above, when Compton scattering is dominant, and, in the case of single Compton scattering, the number of backscattered and detected photons is proportional to the material density of an object in front of a photon source. Therefore, apparatus 10 may be used to detect any material density anomaly behind the wellbore casing 12. In one embodiment, if there is a defect in the cement 14, such as a defect 24 filled with fluid or water as illustrated in FIG. 1, the number of the photons backscattered from the region of the defect 24 and detected by the photon detector 18 will be reduced, since the defect 24 has a lower material density compared with the cement 14. Based on the reduced number of backscattered photons, the defect may be identified and its location may be determined.

Figure 2A:
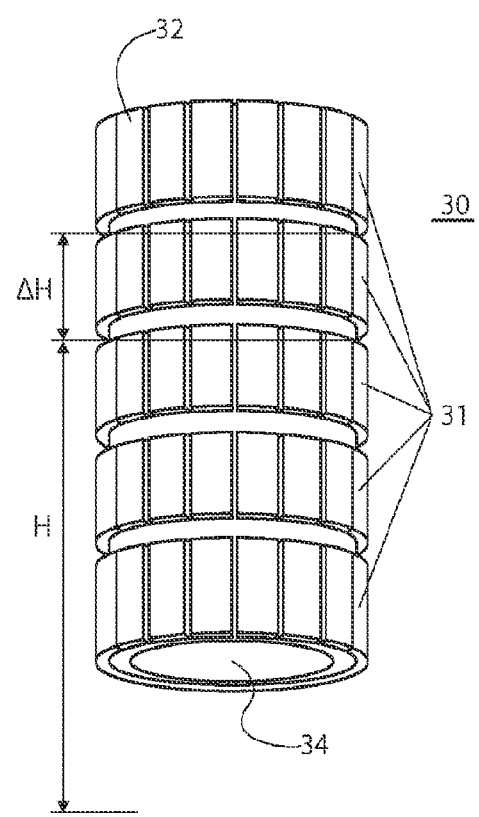
FIG. 2A is a schematic diagram of a position sensitive photon detector that can be used in the downhole logging system of FIG. 1 according to the disclosed embodiments.
Figure 2B:
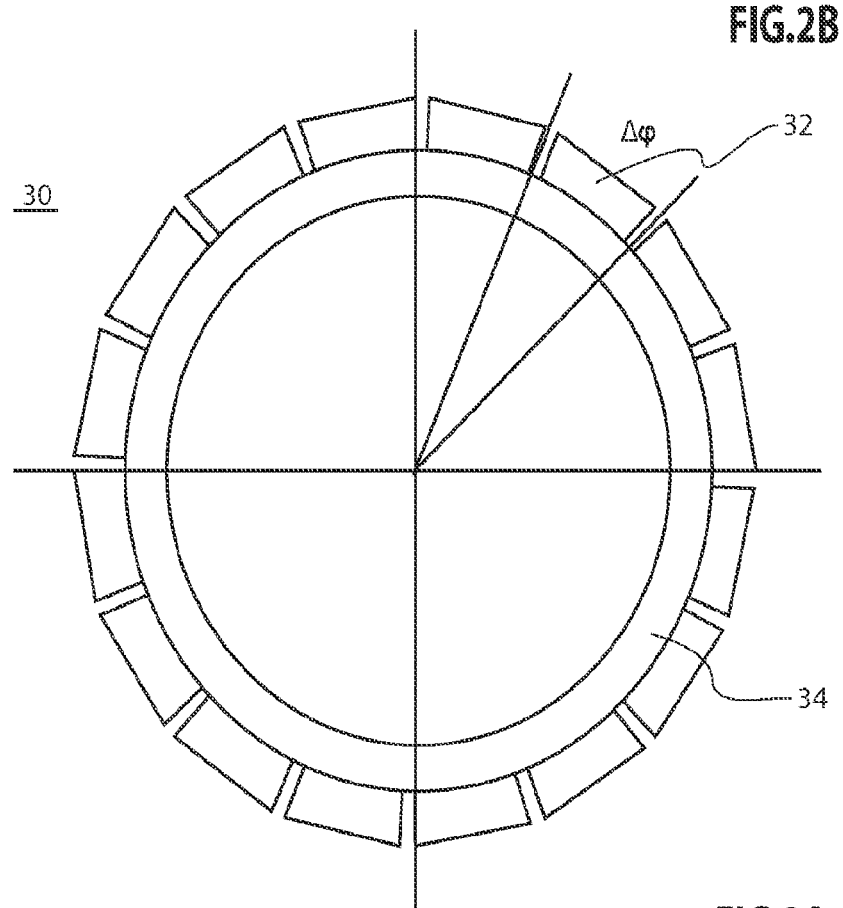
FIG. 2B is a top view of the position sensitive photon detector of FIG. 2A.

FIGS. 2A and 2B are schematic diagrams illustrating a photon detector 30 that can be used in the downhole logging system of FIG. 1 according to a disclosed embodiment. The photon detector 30 includes five photon detector rows 31. Each photon detector row includes sixteen individual photon detector elements which act as individual detector pixels for the photon detector 30. Photon detector pixel 32 is illustrative, and it will be understood of those with skill in the art, that the photon detector 30 includes eighty such detector pixels 32, in the embodiment shown in FIG. 2A. Each pixel 32 has a top side, bottom side, left side and right side with a predetermined height of ΔH. The left side of a pixel is coupled to the right side of an adjacent pixel and the right side of the pixel is coupled to the left side of another adjacent pixel, so that the pixels of each row are coupled one by one and arranged in a ring so that when the rows are stacked concentrically, they form a substantially cylindrical geometry. The substantially cylindrical geometry of the detector rows may be substantially "hollow" along the interior longitudinal axis to form a tube-like assembly. Each pixel 32 subtends an azimuthal angle of Δϕ, as best seen in FIG. 2B. Thus, the photon detector 30 includes a plurality of photon detector pixels, such as illustrative photon detector pixel 32, of 5 rows and 16 columns, for a total of 80 pixels, according to the embodiment shown. The size of Δϕ is determined by the number of columns of the photon detector 30 and is given by $$\Delta \varphi = \frac{2\pi}{M},$$

where "M" is the number of columns of detector pixels used in photo detector 30.

According to an embodiment, photosensor 34 is arranged longitudinally within the cylindrical photon detector 30, as shown in FIG. 2B. Each pixel 32 of the photon detector 30 is individually coupled to a corresponding pixel on the photosensor 34 so that information about the backscattered photons received by any individual photo detector pixel, such as detector pixel 32, may be identified and recorded individually by the downhole tool.

Figure 3A:
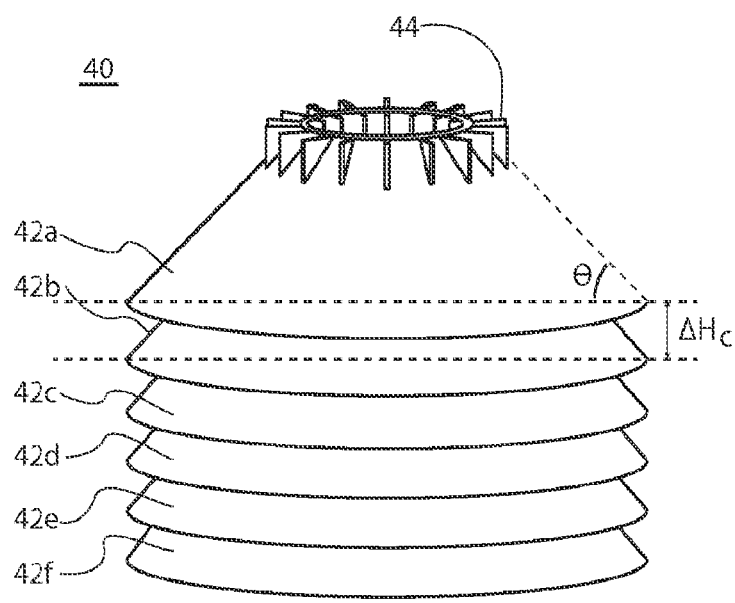
FIG. 3A is a schematic diagram illustrating a collimator according to an embodiment.
Figure 3B:
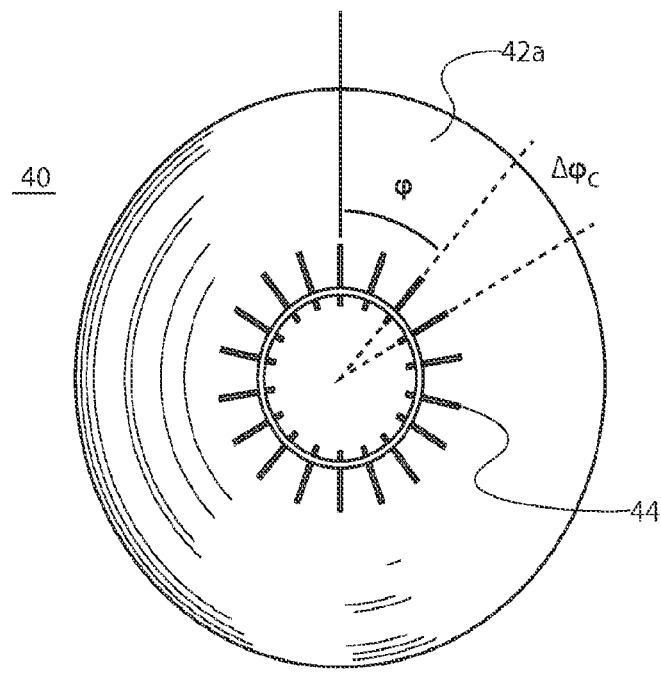
FIG. 3B is a top view of the collimator according to FIG. 3A.
Figure 3C:
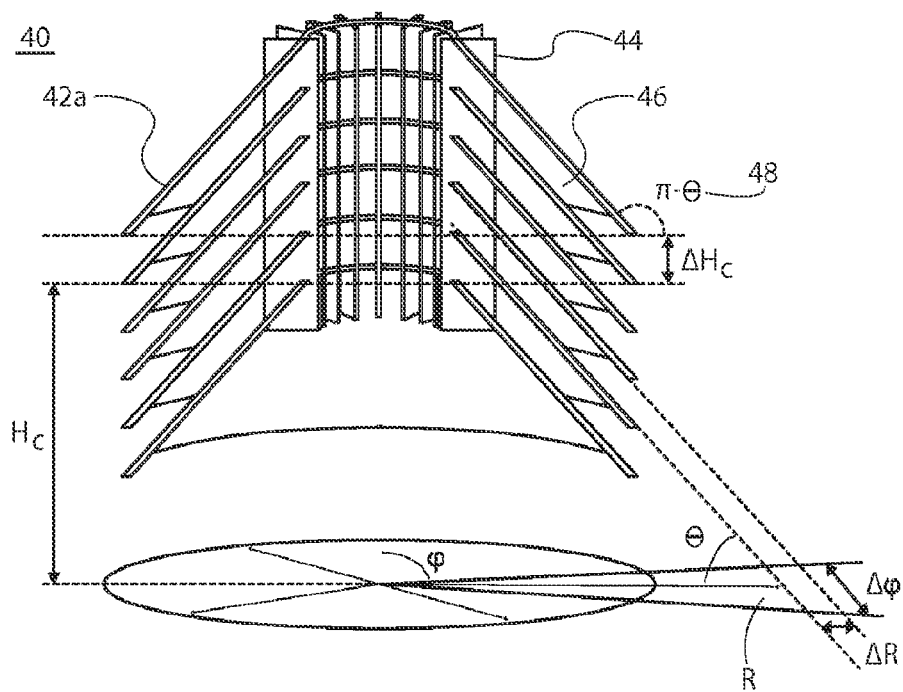
FIG. 3C is a cross-sectional view of a collimator according to FIG. 3A.

FIGS. 3A, 3B and 3C, illustrate a collimator according to an embodiment of the invention. FIG. 3A is a perspective view, FIG. 3B is a top view, and FIG. 3C is a cross-sectional view of the collimator 40. With reference to FIG. 3B, the collimator 40 may be arranged as a stack of individual concentric, frustoconical shaped collimators. Radial collimator 42a is illustrative of the individual collimators 42a-42c forming the stack. Of course, it will be understood that other embodiments are possible, for example, the radial collimators do not have to be individual members or elements. In one embodiment, the collimator structure 40 may be constructed as a whole by, for example, 3-D printing. In other embodiments, the radial collimators could be manufactured individually, then assembled together to form the overall structure 40. Referring to FIG. 3A, radial collimator 42a is designed with a desired base angle θ measured relative to the base of the frustoconical shape of the collimator 42a. Any two adjacent radial collimators in the stack may be considered to form a pair, such as collimators 42a and 42b. Each pair of the radial collimators is separated by a desired distance $\Delta H_C$. As best seen in FIG. 3C, the stack of conical radial collimators create a series of pathways between the radial collimators 42a-42f, such as illustrative pathway 46, that allow backscattered photons to reach the cylindrical arrangement of photon detectors positioned longitudinally at the center of the collimator 40. These pathways 46 reject unwanted photons, which may have been subjected to multiple Compton scattering events and would represent unwanted noise if detected. Instead, conical radial collimators 42a-42f create pathways 46 that allow only photons backscattered at the angle 48, which is determined by π−θ, from the wellbore to reach the photon detector. For any pair of adjacent radial collimators, this effectively limits the photons they allow to pass to the photon detector to photons originating from a desired radial range measured from the centerline of the collimator stack. More particularly, where "R" is the radius from the centerline of the collimator stack, each pair of radial collimators 42 limits detection of photons to those coming from the region defined between R and R+ΔR, where R and ΔR are given by:

$$R = \frac{H_C}{\tan\theta},$$

$$\Delta R = \frac{\Delta H_C}{\tan\theta}$$

In an embodiment, the collimator 40 may also be arranged to provide an azimuthal restriction on the photons that are allowed to be received by the photon detector. As depicted in FIG. 3C, the collimator 40 also includes a number of vertical blade-shaped collimators, such as blade-shaped collimator 44, that may be used to define the azimuthal origin of photons to be detected. In the particular embodiment shown in FIG. 3C, there are 16 blade-shaped azimuthal collimators, only 8 of which are shown in the cross-sectional drawing. Those of skill in the art will recognize that other embodiments having different numbers of azimuthal collimators may readily be created as a matter of design choice. As best seen in FIG. 3B, each azimuthal collimator 44 extends along the longitudinal direction of the radial collimators 42a-42f and protrudes a sufficient distance radially so that each pair of azimuthal collimators defines an azimuthal angle $\phi_C$, which subtends an angle of $$\Delta \varphi_C = \frac{2\pi}{M_C},$$

where $M_C$ is the number of azimuthal collimators in the stack. Therefore, each pair of the azimuthal collimators 44 defines a region between $\phi_C$ and $\phi_C+\Delta\phi_C$ azimuthally. Therefore, in an embodiment combining radial collimators 42 and azimuthal collimators 44, each photon detector pixel 32 is restricted to a pathway that allows it to preferentially detect photons coming from a region defined by R and R+ΔR, radially, and by $\phi_C$ and $\phi_C+\Delta\phi_C$, azimuthally, as shown in, for example, FIG. 3C. Embodiments of the collimator 40 may be made of a high atomic number ("high-Z") material, including, but not limited to, lead, tantalum and tungsten, in order to lower the noise from unwanted photons that did not travel along a desired pathway 46 to a detector pixel.

Figure 4A:
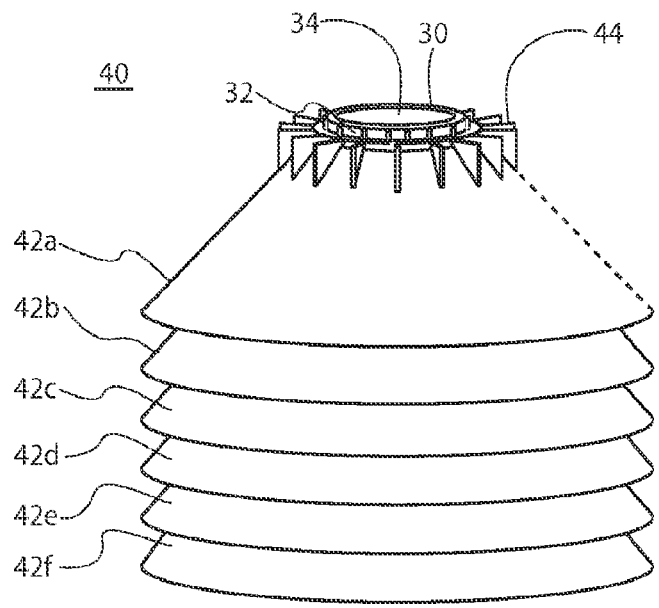
FIG. 4A is a schematic diagram of a photon detector coupled with a collimator and a photosensor according to a disclosed embodiment.
Figure 4B:
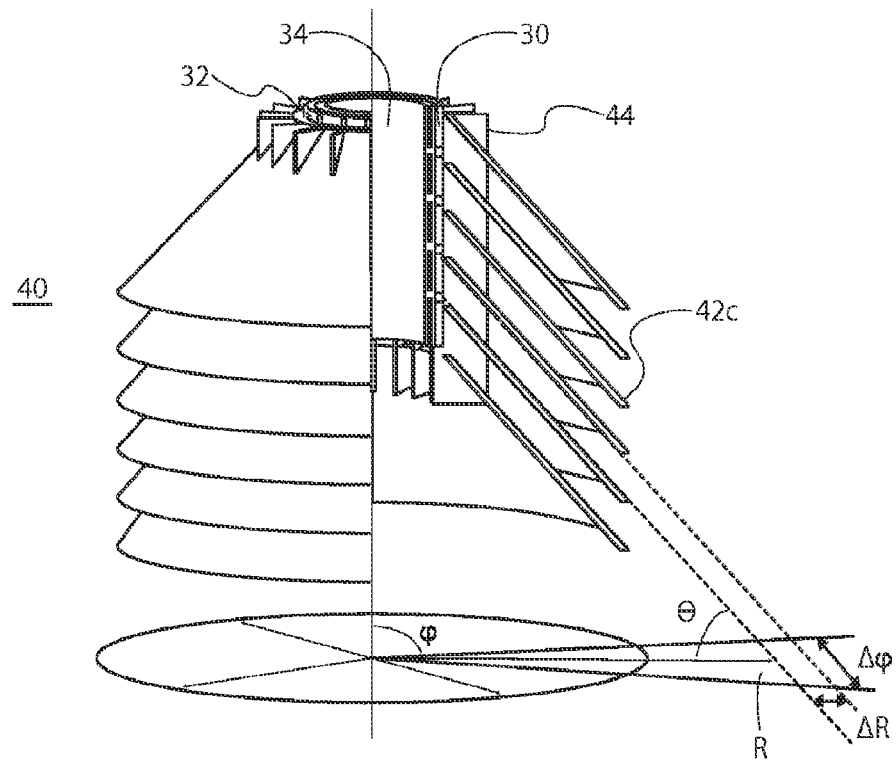
FIG. 4B is a quarter-cutaway view of a collimator according to an embodiment.
Figure 4C:
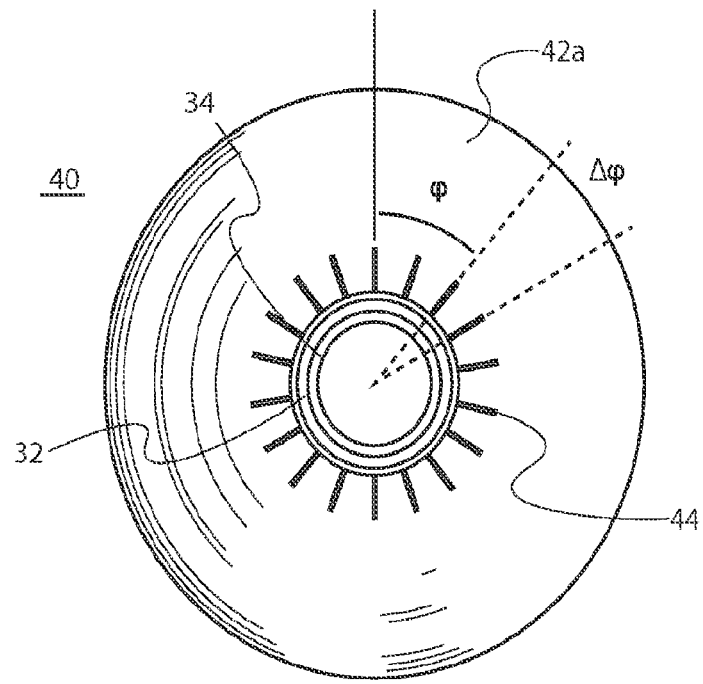
FIG. 4C is a top view of FIG. 4A.

FIGS. 4A, 4B and 4C are schematic diagrams illustrating how the photon detector 30 of FIG. 2 may be coupled with the photosensor 34 and a collimator 40 similar to the embodiment depicted in FIG. 3. FIG. 4A is a perspective view, FIG. 4B is a quarter-cutaway view and FIG. 4C is a top view. The photon detector 30 has a plurality of photon detector rows and photon detector columns to define a plurality of individual photon detector pixels 32. The photosensor 34 is arranged longitudinally into the cylindrical opening of the photon detector 30 as illustrated in FIG. 2, and each photon detector pixel 32 is individually coupled with the photosensor 34. The coupling may be optical or electronic, such as by optical gel, physical wire, or fiber optic connection. The collimator 40 is attached to the photon detector 30 like a sheath surrounding the photon detector 30. As shown in FIGS. 4A-4B, the collimator 40 includes concentrically-arranged frustoconical shaped radial collimators 42a-42f that extend from the photon detector 30 at a predetermined angle θ. The collimator also includes a set of vertical blade-shaped azimuthal collimators 44 that define the azimuthal origin of detected photons. In the depicted embodiment, The number of the conical radial collimators 42 is equal to the number of rows n of the position sensitive photon detector 30, and each pair of the radial collimators 42 is correspondent to a photon detector row.

Each azimuthal collimator 44 is in the longitudinal direction of the photon detector 30 and extends radially from the photon detector 30. For the collimator 40 to be used with the photon detector 30 as shown in FIG. 2, in one embodiment, the number of azimuthal collimators 44 is set to be the number of columns of the position sensitive photon detector 30, and each azimuthal collimator may be positioned where two adjacent photon detector pixels 32 in a row are coupled. Thus, each azimuthal collimator 44 defines an azimuthal angle $\phi$, and $$\Delta\varphi = \frac{2\pi}{M}$$

is the angle subtended by each pair of the azimuthal collimators 44. Therefore each pair of the azimuthal collimators 44 defines a region between ϕ and ϕ+Δϕ azimuthally, which is correspondent to a photon detector column.

With such a collimator 40 attached to the position sensitive photon detector 30, each single pixel 32 is correspondent to a unique region or pathway defined by R and R+ΔR radially and by ϕ and ϕ+Δϕ azimuthally, that is, each single pixel 32 is enclosed by a pair of radial collimators 42 and a pair of azimuthal collimators 44, and the combined radial collimators 42 and azimuthal collimators 44 form a unique pathway for each of the photon detector pixels 32 of the photon detector 30 to collect photons arriving from the corresponding pathway. Thus information obtained from each pixel through the backscattered and detected photons can be combined or integrated to generate material density maps of a target object, and consequently, identify density anomalies of the target object.

Figure 5:
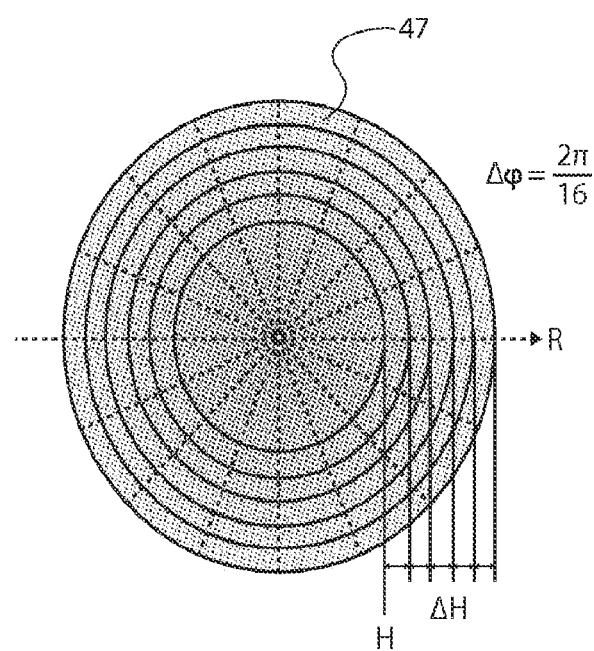
FIG. 5 illustrates the azimuthal and radial coverage of a photon detector coupled with a collimator according to an embodiment.

FIG. 5 illustrates the azimuthal and radial coverage of the photon detector 30 with the collimator 40 according to the disclosed embodiments. In FIG. 5, a 16-column and 5-row position sensitive photon detector 30 is shown, with a backscattering angle of 145°, i.e., θ=35°. Each segment 47 has a one-to-one correspondence to a pixel 32 of the photon detector 30. The 145° backscattering angle in this embodiment is selected for purposes of illustration, and other embodiments are possible. For example, to obtain photon imaging of a target object that is closer to the logging system, the backscattering angle can be smaller, such as 120°, and if the target object is located further from the source, then a greater backscattering angle may be selected. An illustrative backscatter angle useful with embodiments may be between about 130 and 150 degrees, depending on the size of the borehole.

The disclosed embodiments may be used as a downhole imaging device to generate a 2-D material density map of a target object around the device, with improved azimuthal and radial resolution. The design parameters of the photon detector 30 and the collimator 40 can be properly changed to scan borehole fluid, steel casing, cement and the subterranean formation 360° in an azimuthal direction. The conical radial collimators 42 are designed to cover a full 360°, and are able to produce a depth profile of material density along the radial direction. The disclosed embodiments are capable of using a fan beam from a collimated photon source rather than relying on a raster scanning of a pencil beam photon source. For example, a pencil beam of one degree coverage needs to be rasterized 360 times to scan a full 360°, while the disclosed embodiments may collect full azimuthal angle information at once in suitable embodiments. This leads to a significant reduction in downhole operation time.

The photon source, the photon detectors, the radial and azimuthal collimators and the photosensors can be fabricated in a compact apparatus, providing an azimuthal and radial sensitivity to the photon detector. Data processing requires only photon counts from the photon detector, which may be translated into a material density map. The disclosed embodiments may also use an electronic photon source, such as an x-ray tube, which generally requires less regulation.

In other embodiments, there is provided a downhole tool that includes a photon source, a photon detector having a plurality of detector pixels in a cylindrical row and column arrangement, and a radial collimator having at least two concentric frustoconical collimators circumferentially arranged about the photon detector and at least two azimuthal collimating members radially arranged with respect to the photon detector, wherein one of the azimuthal collimating members is on a first side of a detector pixel and a second azimuthal collimators is on a second side of a detector pixel opposite the first side.

In still another embodiment, there is provided a collimator that includes a plurality of concentric frustoconical radial collimators that extend at a predefined angle, each pair of the frustoconical radial collimators being separated by a predetermined distance, and a plurality of blade-shaped azimuthal collimators arranged along the longitudinal axis of the concentric frustoconical radial collimators, the blade-shaped azimuthal collimators extending radially from the longitudinal axis of the frustoconical radial collimators with a subtended angle of $$\frac{2\pi}{M}$$

formed by each pair of the blade-shaped azimuthal collimators, wherein a photon pathway is defined by each pair of the azimuthal collimators and each pair of the radial collimators.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A downhole tool, comprising:
a photon source;
a photon detector having a plurality of discrete detector pixels in a cylindrical row and column arrangement, each detector pixel coupled to an adjacent detector pixel within a given cylindrical row;
a radial collimator having at least two concentric frustoconical collimators circumferentially arranged about the photon detector, and at least two azimuthal collimators radially arranged with respect to the photon detector, wherein one of the azimuthal collimators is on a first side of a detector pixel and a second azimuthal collimator is on a second side of the detector pixel opposite the first side.

2. The downhole tool of claim 1, wherein the radial collimator further comprises a plurality of concentric frustoconical radial collimators that extend radially from the photon detector at a predefined angle, each adjacent pair of the frustoconical radial collimators being separated at a predetermined distance to create a photon pathway that corresponds to a row of detector pixels.

3. The downhole tool of claim 2, further comprising a plurality of blade-shaped azimuthal collimators arranged in the longitudinal direction of the photon detector, wherein the blade-shaped azimuthal collimators extend radially from the photon detector to subtend an angle formed by a pair of the azimuthal collimators corresponding to a photon detector column.

4. The downhole tool of claim 3, wherein the radial collimator is coupled to the photon detector so that each photon detector pixel is correspondent to a region defined—by—a pair of the azimuthal collimators and a pair of the concentric frustoconical radial collimators.

5. The downhole tool of claim 4, wherein the radial collimator is made of a high-Z material.

6. The downhole tool of claim 4, wherein the radial collimator is made of lead, tantalum or tungsten.

7. The downhole tool of claim 4, wherein the photon detector comprises a gamma-ray scintillator or a solid state detector.

8. A collimator, comprising:
  a plurality of concentric frustoconical radial collimators that extend radially from the longitudinal axis of the radial collimators at a predefined angle, wherein adjacent pairs of the frustoconical radial collimators are separated by a predetermined distance; and
  a plurality of blade-shaped azimuthal collimators arranged along the longitudinal axis of the concentric frustoconical radial collimators, the blade-shaped azimuthal collimators extending radially outward from the longitudinal axis of the frustoconical radial collimators with a subtended angle of $2\pi/M$, where M is the number of azimuthal collimators, formed by each adjacent pair of the blade-shaped azimuthal collimators;
  wherein a photon pathway is created by adjacent azimuthal collimators and adjacent frustoconical radial collimators, each photon pathway corresponding to one detector pixel in a plurality of discrete detector pixels.

9. The collimator of claim 8, wherein the collimator is made of a high-Z material.

10. The collimator of claim 9, wherein the collimator is made of lead, tantalum or tungsten.

11. A system for detecting defects in the cement surrounding a wellbore, the system comprising:
  an apparatus for lowering a tool into the wellbore and receiving signals from the tool indicating a photon count, the tool further comprising:
    a photon source;
    a photon detector having a plurality of detector pixels in a cylindrical row and column arrangement, each detector pixel coupled to an adjacent detector pixel within a given cylindrical row;
    a radial collimator having at least two concentric frustoconical collimators circumferentially arranged about the photon detector, and at least two azimuthal collimators radially arranged with respect to the photon detector, wherein one of the azimuthal collimators is on a first side of a detector pixel and a second azimuthal collimator is on a second side of the detector pixel opposite the first side.

12. The system of claim 11, wherein the radial collimator further comprises a plurality of concentric frustoconical radial collimators that extend radially from the photon detector at a predefined angle, each adjacent pair of the frustoconical radial collimators being separated at a predetermined distance to create a photon pathway that corresponds to a row of detector pixels.

13. The system of claim 12, further comprising a plurality of blade-shaped azimuthal collimators arranged in the longitudinal direction of the photon detector, wherein the blade-shaped azimuthal collimators extend radially from the photon detector to subtend an angle formed by a pair of the azimuthal collimators corresponding to a photon detector column.

14. The system of claim 13, wherein the radial collimator is coupled to the photon detector so that each photon detector pixel is correspondent to a region defined—by—a pair of the azimuthal collimators and a pair of the concentric frustoconical radial collimators.

15. The system of claim 14, wherein the radial collimator is made of a high-Z material.

16. The system of claim 14, wherein the radial collimator is made of lead, tantalum or tungsten.

17. The system of claim 14, wherein the photon detector comprises a gamma-ray scintillator or a solid state detector.

* * * * *